US012746799B2

(12) United States Patent
Hou et al.

(10) Patent No.: US 12,746,799 B2
(45) Date of Patent: Sep. 29, 2026

(54) SYSTEM AND METHOD FOR CONTROLLING ELECTRIC COMPRESSOR FOR VEHICLE

(71) Applicants: HYUNDAI MOTOR COMPANY, Seoul (KR); KIA CORPORATION, Seoul (KR)

(72) Inventors: Qing Dong Hou, Yantai (CN); Tae Hun Jung, Seoul (KR); Xiao Rui Zhai, Yantai (CN)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 86 days.

(21) Appl. No.: 18/677,201

(22) Filed: May 29, 2024

(65) Prior Publication Data

US 2025/0206102 A1 Jun. 26, 2025

(30) Foreign Application Priority Data

Dec. 22, 2023 (CN) ......................... 202311782614.5

(51) Int. Cl.
*B60H 1/00* (2006.01)
*B60H 1/32* (2006.01)

(52) U.S. Cl.
CPC ....... *B60H 1/00792* (2013.01); *B60H 1/0075* (2013.01); *B60H 1/3208* (2013.01)

(58) Field of Classification Search
CPC .............. B60H 1/00792; B60H 1/3208; B60H 2001/3266; B60H 2001/3272; B60H 1/00735; B60H 1/00764
See application file for complete search history.

(56) References Cited

U.S. PATENT DOCUMENTS

2004/0206102 A1* 10/2004 Homan ................. F25B 49/025 62/229
2013/0160986 A1* 6/2013 Hashigaya ........... B60H 1/3208 62/215

(Continued)

FOREIGN PATENT DOCUMENTS

CN 103940050 A * 7/2014 .............. F04B 49/06
CN 109028676 A * 12/2018 ........... B60H 1/3205

(Continued)

OTHER PUBLICATIONS

CN103940050 EPO translation with paragraph numbers (Year: 2014).*

(Continued)

*Primary Examiner* — Rachid Bendidi
(74) *Attorney, Agent, or Firm* — MCDONNELL BOEHNEN HULBERT & BERGHOFF LLP

(57) ABSTRACT

A system for controlling an electric vehicle includes a user requirement setting apparatus, a vehicle velocity detection apparatus, an out-vehicle temperature detection apparatus, an in-vehicle temperature detection apparatus, a solar illumination detection apparatus, and a control apparatus. The control apparatus is configured to acquire an air conditioner temperature and a blower step number set by a user, a driving velocity of the vehicle, an ambient temperature, a solar illumination outside the vehicle, and the internal temperature of the vehicle, determine a rotation speed limitation rating of the electric compressor, determine a final permitted vehicle velocity, compare the driving velocity of the vehicle and the final permitted vehicle velocity, and when the driving velocity of the vehicle is less than the final permitted vehicle velocity, determine a target electric compressor rotation speed according to the rotation speed limitation rating of the electric compressor.

13 Claims, 2 Drawing Sheets

(56) References Cited

U.S. PATENT DOCUMENTS

| | | | | |
|---|---|---|---|---|
| 2018/0194361 | A1* | 7/2018 | Dudar | B60W 10/30 |
| 2019/0248213 | A1* | 8/2019 | Jung | B60H 1/3208 |
| 2020/0294401 | A1* | 9/2020 | Kerecsen | G08G 1/205 |

FOREIGN PATENT DOCUMENTS

| | | | | | |
|---|---|---|---|---|---|
| CN | 110549824 | B | | 2/2023 | |
| JP | 2005127234 | A | * | 5/2005 | F04B 35/00 |
| JP | 2020-059427 | A | | 4/2020 | |

OTHER PUBLICATIONS

CN109028676 EPO translation with paragraph numbers (Year: 2018).*

JP2005127234 EPO translation with paragraph numbers (Year: 2005).*

* cited by examiner

SYSTEM AND METHOD FOR CONTROLLING ELECTRIC COMPRESSOR FOR VEHICLE

CROSS REFERENCE TO RELATED APPLICATIONS

This application claims priority to and the benefit of Chinese Patent Application No. 202311782614.5 filed in the Chinese National Intellectual Property Administration on Dec. 22, 2023, the entire contents of which are incorporated herein by reference.

BACKGROUND

(a) Field

The present disclosure relates to a control technology field of a vehicle, and more particularly, to a system and a method for controlling an electric compressor of a vehicle.

(b) Description of the Related Art

In recent years, as the perception of environmental protection increases, new energy cars are gradually attracting attention from people, and plug-in hybrid vehicles and electric vehicles are becoming gradually preferred by people. An electric compressor as an important component of an air conditioning system of the new energy vehicle serves to compress a low-pressure gas refrigerant into a high pressure gas refrigerant, and supplies thermal energy into the car or discharges the thermal energy to the outside of the car through an action of an evaporator and a condenser.

A compressor of a fuel vehicle in the related art rotates a compressor body through an electronic clutch by an engine to compress gas, while the new energy vehicle has no engine, so a permanent magnet synchronous motor is rotated by an electric compressor control apparatus to provide mechanical energy.

Currently, all electric compressor control technologies have been developed based on internal combustion engine (ICE) vehicles, for example, focus on in-vehicle comfort, and control a compressor rotation speed depending on air conditioner setting of a user, which allows an evaporator temperature to reach a target temperature as quickly as possible.

However, the new energy cars are paying more attention to energy consumption of the air conditioners, and in addition to a cooling speed and temperature stability, the energy consumption of the air conditioner is also an important factor, so the conventional compressor control strategy can no longer meet the needs of the customer. Therefore, developing a new electric compressor control strategy is very meaningful.

The description of the background art is to provide convenience to thoroughly understand the technical measures of the present disclosure (used technical means, technical problems to be solved, and obtained technical effects, etc.), and it should not be construed that it is recognized or implied in any form that the information configures prior art known to those skilled in the art.

SUMMARY

The present disclosure has been made in an effort to limit an electric compressor rotation speed according to actual cooling requirements (preset temperature and blower step number) of a user and system operation states (vehicle ambient temperature, solar illumination, vehicle interior temperature, and vehicle driving velocity) to obtain optimal performance among a cooling speed, temperature stability, and energy consumption.

An exemplary embodiment of the present disclosure provides a system for controlling an electric compressor of a vehicle. The system includes a user requirement setting apparatus, a vehicle velocity detection apparatus, an out-vehicle temperature detection apparatus, an in-vehicle temperature detection apparatus, a solar illumination detection apparatus, and a control apparatus, and the user requirement setting apparatus is configured to receive an air conditioner temperature and a blower step number set by a user, the vehicle velocity detection apparatus is configured to detect a driving velocity of the vehicle, the out-vehicle temperature detection apparatus is configured to detect a vehicle ambient temperature, the in-vehicle temperature detection apparatus is configured to detect a vehicle internal temperature, the solar illumination detection apparatus is configured to detect a solar illumination outside the vehicle, and the control apparatus is communicatively connected to the user requirement setting apparatus, the vehicle velocity detection apparatus, the out-vehicle temperature detection apparatus, the in-vehicle temperature detection apparatus, and the solar illumination detection apparatus, and configured to acquire the air conditioner temperature and the blower step number set by the user, the driving velocity of the vehicle, the vehicle ambient temperature, the solar illumination outside the vehicle, and the vehicle internal temperature, determine a rotation speed limitation rating of the electric compressor based on the air conditioner temperature and the blower step number set by the user, determine a final permitted vehicle velocity based on the vehicle ambient temperature, the solar illumination outside the vehicle, and the vehicle internal temperature, compare the driving velocity of the vehicle and the final permitted vehicle velocity, and when the driving velocity of the vehicle is less than the final permitted vehicle velocity, determine a target electric compressor rotation speed according to the rotation speed limitation rating of the electric compressor to operate the electric compressor according to the target electric compressor rotation speed.

The control apparatus may be further configured to determine a cooling rating corresponding to the air conditioner temperature set by the user, determine a cooling rating corresponding to the blower step number set by the user, determine a cooling rating corresponding to a number of limitations of the electric compressor rotation speed, and determine the rotation speed limitation rating of the electric compressor based on the cooling rating corresponding to the air conditioner temperature set by the user, the cooling rating corresponding to the blower step number set by the user, and the cooling rating corresponding to the number of limitations of the electric compressor rotation speed.

The control apparatus may be further configured to calculate a minimum value of the cooling rating corresponding to the air conditioner temperature set by the user and the cooling rating corresponding to the blower step number set by the user, and determine the rotation speed limitation rating of the electric compressor by adding the minimum value to the cooling rating corresponding to the number of limitations of the electric compressor rotation speed.

The control apparatus may be further configured to determine permitted vehicle velocities corresponding to the vehicle ambient temperature, the solar illumination, and the vehicle internal temperature, respectively, and acquire a sum of the permitted vehicle velocities to obtain the final permitted vehicle velocity.

The control apparatus may be further configured to determine a target electric compressor rotation speed coefficient based on a current required rotation speed of the electric compressor and the rotation speed limitation rating of the electric compressor, and determine the target electric compressor rotation speed by multiplying the target electric compressor rotation speed coefficient by the required rotation speed of the electric compressor.

The control apparatus may be further configured to, when the electric compressor is operated according to the target electric compressor rotation speed, and then when the current required rotation speed of the electric compressor is more than a predetermined rotation speed, recalculate the target electric compressor rotation speed to operate the electric compressor according to the recalculated target electric compressor rotation speed.

An initial value of the number of limitations of the electric compressor rotation speed may be set to 0, and whenever the target electric compressor rotation speed is determined within a predetermined time, a value of the number of limitations of the electric compressor rotation speed may be increased by 1.

A communication connection may include a connection through a wired communication scheme, and the wired communication scheme may include a control apparatus area network, a general serial bus, a high definition multimedia interface, and a digital video interface.

Another exemplary embodiment of the present disclosure provides a method for controlling an electric compressor of a vehicle. The method includes: acquiring an air conditioner temperature and a blower step number set by a user, a driving velocity of the vehicle, a vehicle ambient temperature, a solar illumination outside the vehicle, and a vehicle internal temperature; determining a rotation speed limitation rating of an electric compressor based on the air conditioner temperature and the blower step number set by the user; determining a final permitted vehicle velocity based on the vehicle ambient temperature, the solar illumination, and the vehicle internal temperature; comparing the driving velocity of the vehicle and the final permitted vehicle velocity; determining, when the driving velocity of the vehicle is less than the final permitted vehicle velocity, a target electric compressor rotation speed according to the rotation speed limitation rating of the electric compressor; and operating the electric compressor according to the target electric compressor rotation speed.

The determining a rotation speed limitation rating of an electric compressor may include determining a cooling rating corresponding to the air conditioner temperature set by the user, determining a cooling rating corresponding to the blower step number set by the user, determining a cooling rating corresponding to a number of limitations of the electric compressor rotation speed, and determining the rotation speed limitation rating of the electric compressor based on the cooling rating corresponding to the air conditioner temperature set by the user, the cooling rating corresponding to the blower step number set by the user, and the cooling rating corresponding to the number of limitations of the electric compressor rotation speed.

The determining a rotation speed limitation rating of an electric compressor may further include: calculating a minimum value of the cooling rating corresponding to the air conditioner temperature set by the user and the cooling rating corresponding to the blower step number set by the user, and determining the rotation speed limitation rating of the electric compressor by adding the minimum value to the cooling rating corresponding to the number of limitations of the electric compressor rotation speed.

The determining a final permitted vehicle velocity may include determining permitted vehicle velocities corresponding to the vehicle ambient temperature, the solar illumination, and the vehicle internal temperature, respectively, and acquiring a sum of the permitted vehicle velocities to obtain the final permitted vehicle velocity.

The determining a target electric compressor rotation speed may include determining a target electric compressor rotation speed coefficient based on a current required rotation speed of the electric compressor and the rotation speed limitation rating of the electric compressor, and determining the target electric compressor rotation speed by multiplying the target electric compressor rotation speed coefficient by the required rotation speed of the electric compressor.

The method may further include recalculating the target electric compressor rotation speed again when the electric compressor is operated according to the target electric compressor rotation speed and then the current required rotation speed of the electric compressor is more than a predetermined rotation speed, and operating the electric compressor according to the recalculated target electric compressor rotation speed.

The method may further include setting an initial value of the number of limitations of the electric compressor rotation speed to 0, and whenever the target electric compressor rotation speed is determined within a predetermined time, increasing a value of the number of limitations of the electric compressor rotation speed by 1.

The present disclosure adopts the above technical measures and has the following beneficial effects.

According to an exemplary embodiment of the present disclosure, a system and a method for controlling an electric compressor of a vehicle can reasonably control and adjust a rotation speed of an electric compressor by limiting an electric compressor rotation speed according to actual cooling requirements (preset temperature and blower step number) of a user and system operation states (vehicle ambient temperature, solar illumination, vehicle internal temperature, and vehicle driving velocity) to provide a pleasant riding environment, save energy, and implement high-efficiency cooling effect.

BRIEF DESCRIPTION OF THE FIGURES

Hereinafter, exemplary embodiments of the present disclosure will be described with reference to the drawings. For clear explanation, the same member in different drawings is represented by the same reference numeral. It should be noted that the drawings are just exemplary and are not necessarily drawn to scale.

DETAILED DESCRIPTION

Hereinafter, an exemplary embodiment of the present disclosure will be described in detail, and the exemplary embodiment will be conducted on the premise of the technical measure of the present disclosure, and a detailed implementation and a specific operation process are presented, but the protection scope of the present disclosure is not limited to the following exemplary embodiment.

Hereinafter, exemplary embodiments of the present disclosure will be described in detail with reference to the accompanying drawings.

Figure 1:
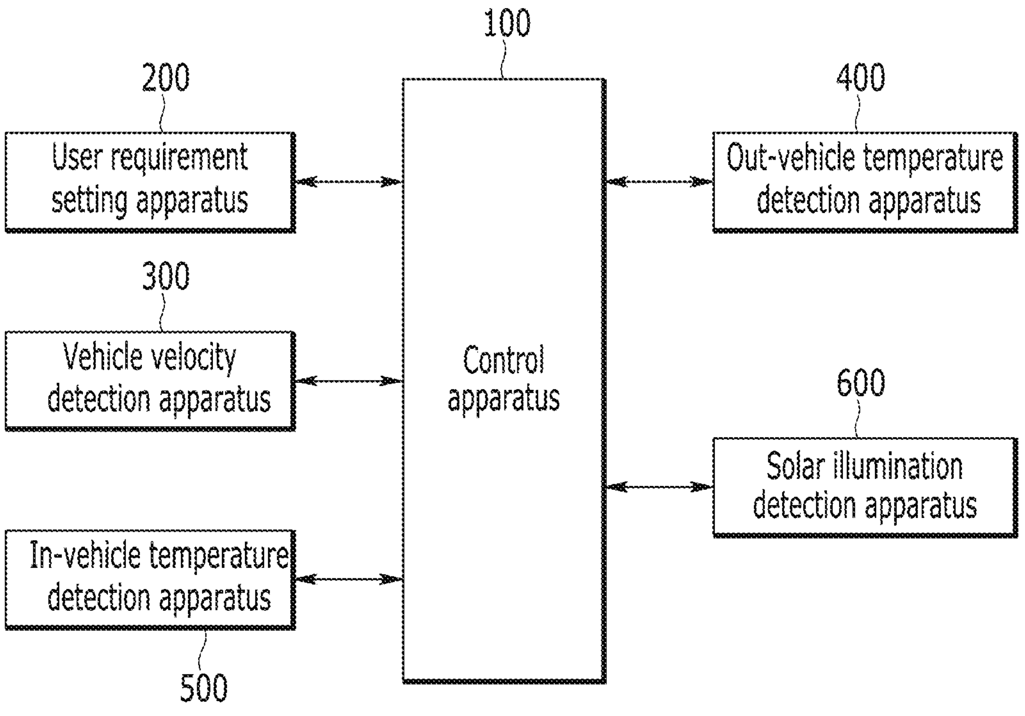
FIG. 1 is a block diagram of a system for controlling an electric compressor of a vehicle according to an exemplary embodiment of the present disclosure.

FIG. 1 is a block diagram of a system for controlling an electric compressor of a vehicle according to an exemplary embodiment of the present disclosure. Referring to FIG. 1, the system for controlling an electric compressor of a vehicle may include a control apparatus 100, a user requirement setting apparatus 200, a vehicle velocity detection apparatus 300, an out-vehicle temperature detection apparatus 400, an in-vehicle temperature detection apparatus 500, and a solar illumination detection apparatus 600. The control apparatus 100 may be communicatively connected to each of the user requirement setting apparatus 200, the vehicle velocity detection apparatus 300, the out-vehicle temperature detection apparatus 400, the in-vehicle temperature detection apparatus 500, and the solar illumination detection apparatus 600.

The user requirement setting apparatus 200 may be configured to receive an air conditioner temperature and a blower step number set by a user, and send the received air conditioner temperature and blower step number set by the user to the control apparatus 100. The user requirement setting apparatus 200 may include an air conditioner temperature control knob and a blower step number control knob.

The vehicle velocity detection apparatus 300 (e.g., a wheel sensor, a vehicle velocity sensor, etc.) may be configured to detect a velocity of the vehicle, and send the detected velocity of the vehicle to the control apparatus 100.

The out-vehicle temperature detection apparatus 400 (e.g., a temperature sensor, etc.) may be configured to detect an ambient temperature of the vehicle, and send the detected ambient temperature of the vehicle to the control apparatus 100.

The in-vehicle temperature detection apparatus 500 (e.g., the temperature sensor, etc.) may be configured to detect an internal temperature of the vehicle, and send the detected internal temperature of the vehicle to the control apparatus 100.

The solar illumination detection apparatus 600 (e.g. a solar illumination sensor) may be configured to detect a solar illumination outside the vehicle, convert the solar illumination into an electric signal (e.g., a voltage signal), and then send the electric signal to the control apparatus 100.

The control apparatus 100 may be configured to acquire the air conditioner temperature and the blower step number set by the user, the driving velocity of the vehicle, the ambient temperature, the solar illumination, and the internal temperature of the vehicle, determine a rotation speed limitation rating of the electric compressor based on the acquired air conditioner temperature and blower step number set by the user, determine a final permitted vehicle velocity based on the ambient temperature, the solar illumination outside the vehicle, and the internal temperature of the vehicle, compare the driving velocity of the vehicle and the final permitted vehicle velocity, and when the driving velocity of the vehicle is less than the final permitted vehicle velocity, determine a target electric compressor rotation speed according to the rotation speed limitation rating of the electric compressor to operate the electric compressor according to the target electric compressor rotation speed.

The control apparatus 100 may include an air conditioner temperature control unit, a blower step number control unit, an electric compressor control unit, etc.

According to an exemplary embodiment of the present disclosure, the communication connection may include connections through a wired communication and/or wireless communication scheme. The wired communication scheme may include a control apparatus area network (CAN), a general serial bus (USB), a high definition multimedia interface (HDMI) and a digital video interface (DVI), etc., and the CAN may include a powertrain CAN bus (P_CAN), a vehicle body control device CAN bus (B_CAN), a chassis control CAN bus (C_CAN), etc., but the CAN communication scheme is not also limited to the CAN bus communication scheme.

Accordingly, the system for controlling an electric compressor of a vehicle according to an exemplary embodiment of the present disclosure limits an electric compressor rotation speed according to actual cooling requirements (the preset temperature and blower step number) of the user and the system operation states (the vehicle ambient temperature, the solar illumination, the vehicle interior temperature, and the vehicle driving velocity) to obtain optimal performance among a cooling speed, temperature stability, and energy consumption.

Figure 2:
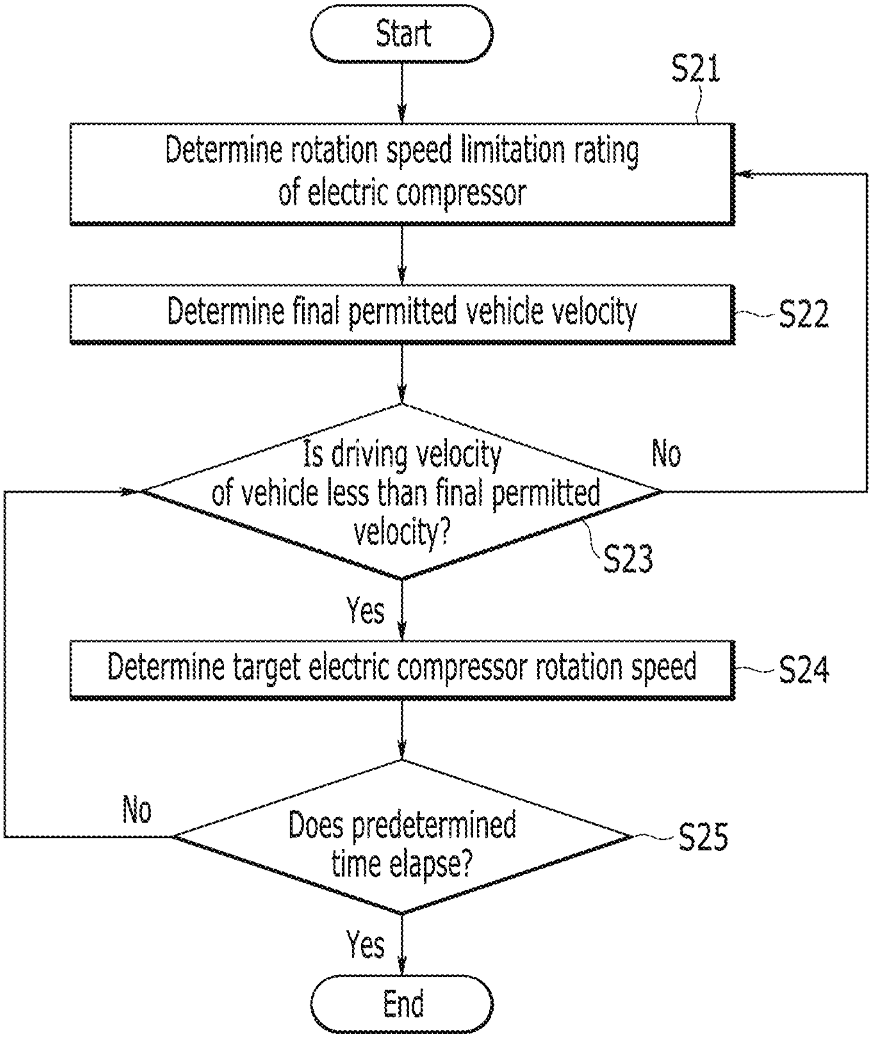
FIG. 2 is a flowchart of a method for controlling an electric compressor of a vehicle according to an exemplary embodiment of the present disclosure.

Hereinafter, an operation process of the system for controlling an electric compressor of a vehicle according to an exemplary embodiment of the present disclosure will be described with reference to FIG. 2.

In step S21, the control apparatus 100 may acquire the air conditioner temperature and the blower step number set by the user, and determine the rotation speed limitation rating of the electric compressor based on the acquired air conditioner temperature and blower step number set by the user.

Specifically, the control apparatus 100 may determine a cooling rating corresponding to the air conditioner temperature set by the user based on a mapping table of the air conditioner temperature Tset set by the user, and a cooling rating ClgTset corresponding thereto, determine a cooling rating corresponding to the blower step number set by the user based on a mapping table of the blower step number Blw set by the user and a cooling rating ClgBlw corresponding thereto, determine a cooling rating corresponding to the number of limitations of the rotation speed of the electric compressor based on a mapping table of the number of limitations of the rotation speed of the electric compressor within a predetermined time and a cooling rating corresponding thereto, and determine a rotation speed limitation rating of the electric compressor based on the cooling rating corresponding to the air conditioner temperature set by the user, the cooling rating corresponding to the blower step number set by the user, and the cooling rating corresponding to the number of limitations of the rotation speed of the electric compressor.

According to an exemplary embodiment of the present disclosure, the control apparatus may include a processor or a microprocessor (MCU). Optionally, the control apparatus may further include a memory. The operation/function of the control apparatus may be implemented as a computer-readable code/algorithm/software stored in the memory, and the memory may include a non-volatile computer-readable recording medium. The non-volatile computer-readable recording medium may be any data storage devices which may be read by the processor or the microprocessor. Examples of the computer-readable recording medium include a hard disk drive (HDD), a solid state drive (SSD), a silicon disk drive (SDD), a read-only memory (ROM), a random access memory (RAM), a CD-ROM, a magnetic tape, a floppy disk, an optical data storage device, etc. The processor or the microprocessor executes the computer-readable code/algorithm/software stored in the non-volatile computer-readable recording medium to execute the operation/function of the control apparatus.

The memory stores the mapping table of the cooling ratings corresponding to the temperature and the blower step number set by the user, respectively. Table 1 shows the air conditioner temperature set by the user and the cooling rating corresponding thereto, and Table 2 shows the blower step number set by the user and the cooling rating corresponding thereto.

TABLE 1

| Tset(° C.) | Tset < 17 | 17 ≤ Tset < 20 | 20 ≤ Tset < 22 | 22 ≤ Tset < 24 | 24 ≤ Tset < 27 | 27 ≤ Tset |
|---|---|---|---|---|---|---|
| ClgTset | 0 | 1 | 1 | 1 | 2 | 2 |

TABLE 2

| Blw | 1st step | 2nd step | 3rd step | 4th step | 5th step | 6th step |
|---|---|---|---|---|---|---|
| ClgBlw | 2 | 2 | 2 | 1 | 1 | 0 |

Accordingly, when the air conditioner temperature and the blower step number set by the user are acquired, the cooling rating corresponding to the air conditioner temperature set by the user and the cooling rating corresponding to the blower step number set by the user may be determined through Table 1 and Table 2, respectively.

When the rotation speed of the electric compressor is limited by considering only the air conditioner temperature and the blower step number set by the user, a cooling effect in the vehicle may not be ensured. In order to ensure a cooling performance in the vehicle, the rotation speed limitation rating of the electric compressor may also be adjusted through the number of limitations of the rotation speed of the electric compressor within the predetermined time.

According to an exemplary embodiment of the present disclosure, whenever the target electric compressor rotation speed is calculated (that is, whenever the target electric compressor rotation speed is adjusted once), a total sum of the number of limitations of the electric compressor rotation speed within the predetermined time may be calculated by increasing a value of the number of limitations of the electric compressor rotation speed by 1.

An initial value of the number of limitations of the electric compressor rotation speed within the predetermined time is set to 0, and the number of limitations of the rotation speed of the electric compressor is updated again with a predetermined time interval. That is, the value of the number of limitations of the electric compressor rotation speed is reset to 0 with the predetermined time interval, and counted again for a next predetermined time.

The predetermined time may be set to 120 s, 180 s, 240 s, or any other time, and preferably, 180 s, and respective predetermined time may be set to be the same or different, but each aspect of the present disclosure is not limited to the specific numerical value.

In response, the memory further stores a mapping table of the cooling table corresponding to the number of limitations of the rotation speed of the electric compressor within the predetermined time. Table 3 shows the number of limitations of the electric compressor rotation speed within the predetermined time and the cooling rating ClgC corresponding thereto.

TABLE 3

| Number of limitation | 0 time | 1 time | 2 times | 3 times | 4 times | 5 times |
|---|---|---|---|---|---|---|
| ClgC | 0 | 0 | −1 | −1 | −1 | −2 |

According to an exemplary embodiment of the present disclosure, a minimum value (min(ClgTset, ClgBlw)) is acquired from the cooling rating corresponding to the air conditioner temperature set by the user and the cooling rating corresponding to the blower step number set by the user, and then a rotation speed limitation rating ClgDmd of the electric compressor is determined by adding the minimum value to the cooling rating ClgC corresponding to the number of limitations of the electric compressor rotation speed. The rotation speed limitation rating ClgDmd of the electric compressor is shown in an equation below.

$$ClgDmd = \min(ClgTset, ClgBlw) + ClgC$$

For example, when the air conditioner temperature set by the user is 24° C., the blower step number set by the user is $3^{rd}$ step, and the number of limitations of the electric compressor rotation speed within the predetermined time (180 s) is 2, the rotation speed limitation rating of the electric compressor is determined as min (2, 2)−1=1.

In step S22, the control apparatus 100 may acquire the ambient temperature and the solar illumination outside the vehicle and the internal temperature of the vehicle, and determine the final permitted vehicle velocity based on the ambient temperature and the solar illumination outside the vehicle and the internal temperature of the vehicle.

The vehicle velocity exerts a significant influence on the operating efficiency of the electric compressor. In other words, the higher the vehicle velocity is, the better the cooling efficiency is. In order to save energy, in the system for controlling an electric compressor of a vehicle according to an exemplary embodiment of the present disclosure, once the vehicle velocity is less than the final permitted vehicle velocity VsPrmt, the rotation speed of the electric compressor is limited by the rotation speed limitation rating of the electric compressor so as to prevent the electric compressor from operating at high speed in a low-efficiency state.

Specifically, the control apparatus 100 determines corresponding permitted vehicle velocities, through the mapping table of each of the ambient temperature, the solar illumination outside the vehicle, and the internal temperature, and a vehicle driving velocity, and acquires a sum of the respective permitted vehicle velocities to obtain the final permitted vehicle velocity.

That is, the final permitted vehicle velocity VsPrmt is determined by a permitted vehicle velocity Kamb corresponding to the vehicle ambient temperature, a permitted vehicle velocity Kincar corresponding to the vehicle internal temperature, and a permitted vehicle velocity Ksolar corresponding to the vehicle external solar illumination, and expressed in an equation below.

$$VsPrmt = Kamb + Kincar + Ksolar$$

Here, the permitted vehicle velocity Kamb corresponding to the vehicle ambient temperature, the permitted vehicle velocity Kincar corresponding to the vehicle internal temperature, and the permitted vehicle velocity Ksolar corresponding to the vehicle external solar illumination are determined through Tables 4, 5, and 6, respectively.

Correspondingly, the memory stores the mapping table of the permitted vehicle velocity Kamb corresponding to the vehicle ambient temperature, the mapping table of the permitted vehicle velocity Kincar corresponding to the vehicle internal temperature, and the mapping table of the permitted vehicle velocity Ksolar corresponding to the vehicle external solar illumination. Table 4 shows the vehicle ambient temperature Tamb and the permitted vehicle velocity Kamb corresponding to the vehicle ambient temperature, Table 5 shows the vehicle internal temperature Tincar and the permitted vehicle velocity Kincar corresponding to the vehicle internal temperature, and Table 6 shows the vehicle external solar illumination S and the permitted vehicle velocity Ksolar corresponding to the vehicle external solar illumination.

TABLE 4

| Ambient temperature Tamb (° C.) | Kamb(km/h) |
|---|---|
| Tamb ≥ 40 | 10 |
| 30 ≤ Tamb < 40 | 20 |
| 20 ≤ Tamb < 30 | 30 |
| 10 ≤ Tamb < 20 | 45 |
| Tamb < 10 | 60 |

TABLE 5

| Internal temperature Tincar (° C.) | Kamb(km/h) |
|---|---|
| Tincar < 25 | 20 |
| 25 ≤ Tincar < 27.5 | 30 |
| 27.5 ≤ Tincar < 30 | 45 |
| Tincar ≥ 30 | 60 |

TABLE 6

| External solar illumination S (V) | Ksolar(km/h) |
|---|---|
| S < 0.5 | 5 |
| 0.5 ≤ S < 1.5 | 0 |

TABLE 6-continued

| External solar illumination S (V) | Ksolar(km/h) |
|---|---|
| 1.5 ≤ S < 2.5 | −5 |
| S ≥ 2.5 | −10 |

Accordingly, when the vehicle ambient temperature, the solar illumination, and the vehicle internal temperature are acquired, the permitted vehicle velocity corresponding to the vehicle ambient temperature, the permitted vehicle velocity corresponding to the vehicle internal temperature, and the permitted vehicle velocity corresponding to the vehicle external solar illumination may be determined through Tables 4, 5, and 6, and then the sum of the respective permitted vehicle velocities is acquired to obtain the final permitted vehicle velocity VsPrmt.

In step S23, the driving velocity of the vehicle is compared with the final permitted vehicle velocity VsPrmt. That is, it is determined whether the driving velocity of the vehicle is less than the final permitted vehicle velocity VsPrmt.

When the driving velocity of the vehicle is less than the final permitted vehicle velocity VsPrmit (that is, "Yes" in the step S23), the target electric compressor rotation speed is determined according to the rotation speed limitation rating of the electric compressor in step S24 to operate the electric compressor according to the target electric compressor rotation speed.

Specifically, a target electric compressor rotation speed coefficient is determined based on a mapping table of a current required rotation speed of the electric compressor, the rotation speed limitation rating of the electric compressor, and the target electric compressor rotation speed coefficient, and the target electric compressor rotation speed is determined by multiplying the target electric compressor rotation speed coefficient by the required rotation speed of the electric compressor.

Correspondingly, the memory stores the mapping table of the target electric compressor rotation speed coefficient to the current required rotation speed of the electric compressor and the rotation speed limitation rating of the electric compressor. Table 7 shows the target electric compressor rotation speed coefficient k to the current required vehicle velocity R of the electric compressor and the rotation speed limitation rating ClgDmd of the electric compressor.

TABLE 7

| Rotation speed limitation rating (ClgDmd) | Current required vehicle velocity (R)(RPM) | | | | | | | | |
|---|---|---|---|---|---|---|---|---|---|
| | 0 | <R ≤ 1000 | 1000 < R ≤ 2000 | 2000 < R ≤ 3000 | 3000 < R ≤ 4000 | 4000 < R ≤ 5000 | 5000 < R ≤ 6000 | 6000 < R ≤ 7000 | 7000 < R ≤ 8000 |
| 0 | 1 | 1 | 1 | 1 | 1 | 1 | 0.83 | 0.71 | 0.62 |
| 1 | 1 | 1 | 1 | 0.93 | 0.87 | 0.84 | 0.70 | 0.60 | 0.50 |
| 2 | 1 | 1 | 1 | 0.83 | 0.72 | 0.66 | 0.55 | 0.47 | 0.40 |

Accordingly, when the current required rotation speed R of the electric compressor is acquired, the target electric compressor rotation speed coefficient k is determined through Table 7, and the target electric compressor rotation speed RTgt is determined by multiplying the target electric compressor rotation speed coefficient k by the current required rotation speed R of the electric compressor. The target electric compressor rotation speed RTgt is shown in an equation below.

$$RTgt = k \times R$$

According to an exemplary embodiment of the present disclosure, the electric compressor is operated according to the target electric compressor rotation speed in the step S24, and then when the current required rotation speed of the electric compressor is more than a predetermined rotation speed, the target electric compressor rotation speed is calculated again to operate the electric compressor according to the target electric compressor rotation speed calculated again. The predetermined rotation speed may be set to 4000 RPM to 6000 RPM, and preferably set to 5000 RPM.

For example, when the rotation speed limitation rating of the electric compressor ClgDmd is 1 and the current required rotation speed of the electric compressor R is 3000 RPM, the target electric compressor rotation speed coefficient is determined as k=0.93, the target electric compressor rotation speed is calculated as RTgt=3000×0.93=2790 RPM, and the electric compressor is operated according to 2790 RPM which is the calculated target electric compressor rotation speed, and then when the current required rotation speed of the electric compressor is more than the predetermined rotation speed (e.g., 5000 RPM), the target electric compressor rotation speed (i.e., 5000×0.84=4200 RPM) is calculated again, and the electric compressor is operated according to 4200 RPM which is the target electric compressor rotation speed calculated again.

In step S25, it is additionally determined whether the limitation operation for the electric compressor rotation speed is performed for more than a predetermined time. That is, it is determined whether the value of the number of limitations of the electric compressor rotation speed needs to be updated again.

When it is determined that the limitation operation for the electric compressor rotation speed is performed for more than the predetermined time, the limitation operation of the electric compressor rotation speed in this step (predetermined time) is terminated. For convenience of description, FIG. 2 illustrates only the limitation operation process of the electric compressor rotation speed within the predetermined time, and an actual control process may include a plurality of control processes, and when the control function is turned on, the rotation speed of the electric compressor of the vehicle can be periodically controlled in real time.

Accordingly, according to an exemplary embodiment of the present disclosure, the method for controlling an electric compressor of a vehicle can reasonably control and adjust the rotation speed of the electric compressor by limiting the electric compressor rotation speed according to actual cooling requirements (preset temperature and blower step number) of the user and the system operation states (vehicle external temperature, light illumination, vehicle interior temperature, and vehicle driving speed) to provide a pleasant riding environment, and save energy and at the same time, realize a high-efficiency cooling effect.

In various exemplary embodiments of the present disclosure, all possible combinations are not listed, but the representative aspects of the present disclosure are described, and the contents described in various exemplary embodiments may be applied independently or as two or more combinations.

The description of the above exemplary embodiments is only for explaining the technical measures of the present disclosure, it should not be considered complete, nor intend to limit the present disclosure to the exact form described. Of course, it is apparent that those skilled in the art can variously modify and change the present disclosure according to the above-described contents. The selection and description of the exemplary embodiment is are intended for those skilled in the art to use each exemplary embodiment of the present disclosure and the different alternative forms and modified forms thereof by interpreting the specific principle of the present disclosure and the actual application of the present disclosure. The scope of the present disclosure is limited by the appended claims and a form equivalent thereto.

The invention claimed is:

1. A system for controlling an electric compressor of a vehicle, the system comprising:
- a user requirement setting apparatus;
- a vehicle velocity detection apparatus;
- an out-vehicle temperature detection apparatus;
- an in-vehicle temperature detection apparatus;
- a solar illumination detection apparatus; and
- a control apparatus; wherein the user requirement setting apparatus is configured to receive an air conditioner temperature and a blower step number set by a user;
- wherein the vehicle velocity detection apparatus is configured to detect a driving velocity of the vehicle;
- wherein the out-vehicle temperature detection apparatus is configured to detect a vehicle ambient temperature;
- wherein the in-vehicle temperature detection apparatus is configured to detect a vehicle internal temperature;
- wherein the solar illumination detection apparatus is configured to detect a solar illumination outside the vehicle and
- wherein the control apparatus is communicatively connected to the user requirement setting apparatus, the vehicle velocity detection apparatus, the out-vehicle temperature detection apparatus, the in-vehicle temperature detection apparatus, and the solar illumination detection apparatus, and is configured to:
  - acquire the air conditioner temperature and the blower step number set by the user, the driving velocity of the vehicle, the vehicle ambient temperature, the solar illumination outside the vehicle, and the vehicle internal temperature;
  - determine a rotation speed limitation rating of the electric compressor based on the air conditioner temperature and the blower step number set by the user;
  - determine a final permitted vehicle velocity based on the vehicle ambient temperature, the solar illumination outside the vehicle, and the vehicle internal temperature; and
  - compare the driving velocity of the vehicle and the final permitted vehicle velocity, and when the driving velocity of the vehicle is less than the final permitted vehicle velocity, determine a target electric compressor rotation speed according to the rotation speed limitation rating of the electric compressor to operate the electric compressor according to the target electric compressor rotation speed, wherein the control apparatus is further configured to:

determine a cooling rating corresponding to the air conditioner temperature set by the user;

determine a cooling rating corresponding to the blower step number set by the user;

determine a cooling rating corresponding to a number of limitations of the electric compressor rotation speed; and determine the rotation speed limitation rating of the electric compressor based on the cooling rating corresponding to the air conditioner temperature set by the user, the cooling rating corresponding to the blower step number set by the user, and the cooling rating corresponding to the number of limitations of the electric compressor rotation speed.

2. The system of claim 1, wherein the control apparatus is further configured to:

calculate a minimum value of the cooling rating corresponding to the air conditioner temperature set by the user and the cooling rating corresponding to the blower step number set by the user; and determine the rotation speed limitation rating of the electric compressor by adding the minimum value to the cooling rating corresponding to the number of limitations of the electric compressor rotation speed.

3. The system of claim 1, wherein the control apparatus is further configured to:

determine permitted vehicle velocities corresponding to the vehicle ambient temperature, the solar illumination, and the vehicle internal temperature, respectively; and acquire a sum of the permitted vehicle velocities to obtain the final permitted vehicle velocity.

4. The system of claim 1, wherein the control apparatus is further configured to:

determine a target electric compressor rotation speed coefficient based on a current required rotation speed of the electric compressor and the rotation speed limitation rating of the electric compressor; and determine the target electric compressor rotation speed by multiplying the target electric compressor rotation speed coefficient by the required rotation speed of the electric compressor.

5. The system of claim 4, wherein the control apparatus is further configured to:

when the electric compressor is operated according to the target electric compressor rotation speed and then the current required rotation speed of the electric compressor is more than a predetermined rotation speed, recalculate the target electric compressor rotation speed to operate the electric compressor according to the recalculated target electric compressor rotation speed.

6. The system of claim 1, wherein:

an initial value of the number of limitations of the electric compressor rotation speed is set to 0; and whenever the target electric compressor rotation speed is determined within a predetermined time, a value of the number of limitations of the electric compressor rotation speed is increased by 1.

7. The system of claim 1, wherein:

a communication connection includes a connection through a wired communication scheme, and the wired communication scheme includes a control apparatus area network and a general serial bus.

8. A method for controlling an electric compressor of a vehicle, the method comprising:

acquiring, by a control apparatus, an air conditioner temperature and a blower step number set by a user, a driving velocity of the vehicle, a vehicle ambient temperature, a solar illumination outside the vehicle, and a vehicle internal temperature;

determining a rotation speed limitation rating of an electric compressor based on the air conditioner temperature and the blower step number set by the user;

determining a final permitted vehicle velocity based on the vehicle ambient temperature, the solar illumination, and the vehicle internal temperature;

comparing the driving velocity of the vehicle and the final permitted vehicle velocity;

determining, when the driving velocity of the vehicle is less than the final permitted vehicle velocity, a target electric compressor rotation speed according to the rotation speed limitation rating of the electric compressor; and operating the electric compressor according to the target electric compressor rotation speed, wherein the determining a rotation speed limitation rating of an electric compressor includes:

determining a cooling rating corresponding to the air conditioner temperature set by the user;

determining a cooling rating corresponding to the blower step number set by the user;

determining a cooling rating corresponding to a number of limitations of the electric compressor rotation speed; and determining the rotation speed limitation rating of the electric compressor based on the cooling rating corresponding to the air conditioner temperature set by the user, the cooling rating corresponding to the blower step number set by the user, and the cooling rating corresponding to the number of limitations of the electric compressor rotation speed.

9. The method of claim 8, wherein the determining a rotation speed limitation rating of an electric compressor further includes:

calculating a minimum value of the cooling rating corresponding to the air conditioner temperature set by the user and the cooling rating corresponding to the blower step number set by the user; and determining the rotation speed limitation rating of the electric compressor by adding the minimum value to the cooling rating corresponding to the number of limitations of the electric compressor rotation speed.

10. The method of claim 8, wherein the determining a final permitted vehicle velocity includes:

determining permitted vehicle velocities corresponding to the vehicle ambient temperature, the solar illumination, and the vehicle internal temperature, respectively; and acquiring a sum of the permitted vehicle velocities to obtain the final permitted vehicle velocity.

11. The method of claim 8, wherein the determining a target electric compressor rotation speed includes:

determining a target electric compressor rotation speed coefficient based on a current required rotation speed of the electric compressor and the rotation speed limitation rating of the electric compressor; and determining the target electric compressor rotation speed by multiplying the target electric compressor rotation speed coefficient by the required rotation speed of the electric compressor.

12. The method of claim 11, further comprising:

recalculating the target electric compressor rotation speed again when the electric compressor is operated according to the target electric compressor rotation speed and then the current required rotation speed of the electric compressor is more than a predetermined rotation speed; and operating the electric compressor according to the recalculated target electric compressor rotation speed.

13. The method of claim 8, further comprising:

setting an initial value of the number of limitations of the electric compressor rotation speed to 0; and whenever the target electric compressor rotation speed is determined within a predetermined time, increasing a value of the number of limitations of the electric compressor rotation speed by 1.

* * * * *